US011186360B2

(12) United States Patent
Cottet et al.

(10) Patent No.: US 11,186,360 B2
(45) Date of Patent: *Nov. 30, 2021

(54) AIRCRAFT LANDING GEAR, AIRCRAFT, AND RELATED METHODS

(71) Applicant: The Boeing Company, Chicago, IL (US)

(72) Inventors: Justin Duane Cottet, Snohomish, WA (US); James E. Cusworth, Snohomish, WA (US); Malcolm Scott Bryant, Maple Valley, WA (US); George Sonnenburg, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/713,525

(22) Filed: Dec. 13, 2019

(65) Prior Publication Data

US 2020/0115042 A1 Apr. 16, 2020

Related U.S. Application Data

(63) Continuation of application No. 15/271,945, filed on Sep. 21, 2016, now Pat. No. 10,562,614.

(51) Int. Cl.
*B64C 25/22* (2006.01)
*B64C 25/34* (2006.01)
(Continued)

(52) U.S. Cl.
CPC .............. *B64C 25/22* (2013.01); *B64C 25/34* (2013.01); *B64C 25/60* (2013.01); *F16F 9/06* (2013.01); *B64C 2025/008* (2013.01)

(58) Field of Classification Search
CPC .... B64C 25/22; B64C 25/60; B64C 2025/008
See application file for complete search history.

(56) References Cited

U.S. PATENT DOCUMENTS

| 2,174,315 A | 9/1939 | Dowty |
| 2,467,015 A | 4/1949 | Dreifke |

(Continued)

FOREIGN PATENT DOCUMENTS

| EP | 2138398 | 12/2009 |
| GB | 2057629 | 4/1981 |

(Continued)

OTHER PUBLICATIONS

European Patent Office, Extended European Search Report for related European Application No. 17190605, dated Nov. 16, 2017.

(Continued)

*Primary Examiner* — Richard R. Green
(74) *Attorney, Agent, or Firm* — Dascenzo Gates Intellectual Property Law, P.C.

(57) ABSTRACT

Methods of retracting a strut assembly for stowing aircraft landing gear comprise longitudinally translating an upper bulkhead within an upper tubular housing from a lower position to an upper position by pressurizing an upper bulkhead space between an upper plate of the upper bulkhead and an upper bulkhead restriction structure that is fixed to the upper tubular housing. Other methods of retracting a strut assembly for stowing aircraft landing gear comprise flowing liquid from an upper liquid chamber positioned above an upper bulkhead within an upper tubular housing to a recoil chamber, wherein during the flowing, the liquid is prevented from passing from the recoil chamber to a pressure chamber that is defined between the upper bulkhead and a lower bulkhead, thereby longitudinally translating a lower tubular housing upward.

20 Claims, 4 Drawing Sheets

(51) Int. Cl.
*B64C 25/60* (2006.01)
*F16F 9/06* (2006.01)
*B64C 25/00* (2006.01)

(56) References Cited

U.S. PATENT DOCUMENTS

| | | |
|---|---|---|
| 2,679,827 A | 6/1954 | Perdue |
| 2,754,072 A | 7/1956 | Shapiro |
| 2,868,482 A | 1/1959 | Westcott, Jr. |
| 2,892,626 A | 6/1959 | Scott et al. |
| 3,580,531 A | 6/1971 | Bock et al. |
| 4,004,762 A | 1/1977 | Jenkins |
| 4,088,286 A | 5/1978 | Masclet et al. |
| 4,445,672 A | 5/1984 | Turiot |
| 4,561,612 A | 12/1985 | Masclet |
| 4,749,152 A | 6/1988 | Veaux et al. |
| 4,907,760 A | 3/1990 | Sealey et al. |
| 5,279,480 A * | 1/1994 | Derrien .................. B64C 25/60 188/313 |
| 5,299,761 A | 4/1994 | Robin et al. |
| 6,182,925 B1 | 2/2001 | Kilner et al. |
| 8,104,711 B2 | 1/2012 | Bennett et al. |
| 8,448,900 B2 | 5/2013 | Mellor et al. |
| 8,556,209 B2 | 10/2013 | Luce |
| 8,973,725 B2 | 3/2015 | Lavigne et al. |
| 8,998,133 B2 | 4/2015 | Cottet |
| 9,308,989 B2 | 4/2016 | Otto |
| 9,321,525 B2 | 4/2016 | Luce |
| 9,403,592 B2 | 8/2016 | Kallio |
| 9,481,452 B2 | 11/2016 | Lindahl et al. |
| 9,796,468 B2 | 10/2017 | Thompson |
| 9,868,518 B2 | 1/2018 | Elliott |
| 10,442,527 B2 | 10/2019 | Bennett |
| 2018/0244371 A1 | 8/2018 | Simpson et al. |
| 2018/0244372 A1 | 8/2018 | Simpson et al. |
| 2018/0244373 A1 | 8/2018 | Mellor et al. |
| 2018/0346102 A1 | 12/2018 | Dahl et al. |

FOREIGN PATENT DOCUMENTS

| | | |
|---|---|---|
| JP | 2018172106 | 11/2018 |
| WO | WO 2011/119283 | 9/2011 |

OTHER PUBLICATIONS

Machine-generated English translation of the abstract of JP 2018172106 downloaded from Espacenet on Jul. 11, 2019.

* cited by examiner

AIRCRAFT LANDING GEAR, AIRCRAFT, AND RELATED METHODS

RELATED APPLICATION

This application is a continuation of and claims priority to U.S. patent application Ser. No. 15/271,945, filed on Sep. 21, 2016, and entitled AIRCRAFT LANDING GEAR, AIRCRAFT, AND RELATED METHODS, the disclosure of which is incorporated herein by reference.

FIELD

The present disclosure relates to aircraft landing gear.

BACKGROUND

Aircraft with one or more of large engine fan diameters, long fuselages, long wings, and specialized under-aircraft payloads, for example, may require a tall landing gear structure to provide ground clearance to the engine and sufficient clearance to the tail during take-off. While the aircraft is in flight, the landing gear structures generally are stored within corresponding wheel wells in the fuselage of the aircraft. Integrating larger landing gear structures into the aircraft may impose expensive design constraints on the aircraft and also may add weight, which in turn requires greater fuel consumption by the aircraft.

Landing gear structures on aircraft generally employ an oleo strut shock absorber, in which a piston compresses a volume that includes both a compressible gas and an incompressible liquid. The volume includes two chambers separated by an orifice through which the liquid flows, such that the overall structure provides both resilient shock absorption and dampening of the oscillation of the oleo strut shock absorber. A landing gear structure that includes an oleo strut shock absorber may be compressed into a retracted configuration for stowage in the wheel well during flight. However, achieving the retracted configuration may require compressing the compressible gas to an undesirably high pressure.

SUMMARY

Aircraft landing gear, aircraft, and related methods are disclosed.

A method of retracting a strut assembly for stowing aircraft landing gear comprises longitudinally translating an upper bulkhead within an upper tubular housing from a lower position to an upper position by pressurizing an upper bulkhead space between an upper plate of the upper bulkhead and an upper bulkhead restriction structure that is fixed to the upper tubular housing.

Another method of retracting a struct assembly for stowing aircraft landing gear comprises flowing liquid from an upper liquid chamber positioned above an upper bulkhead within an upper tubular housing to a recoil chamber. During the flowing, the liquid is prevented from passing from the recoil chamber to a pressure chamber that is defined between the upper bulkhead and a lower bulkhead, thereby longitudinally translating a lower tubular housing upward.

A method of servicing an aircraft landing gear comprises, with an upper bulkhead in a lower position, filling an upper bulkhead space between a lower plate and an upper bulkhead restriction structure with hydraulic fluid; filling a pressure chamber, a recoil chamber, an upper liquid chamber, and a liquid conduit that fluidly connects the upper liquid chamber to the recoil chamber with strut liquid; and pressurizing a pressure chamber between the upper bulkhead and a lower bulkhead with strut gas to an extended pressure and thereby transitioning the strut assembly to an extended configuration.

DESCRIPTION

FIGS. 1-4 provide illustrative, non-exclusive examples of strut assemblies 100, of components and/or features of strut assemblies 100, and/or of aircraft 10 including strut assemblies 100, according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure.

Figure 1:
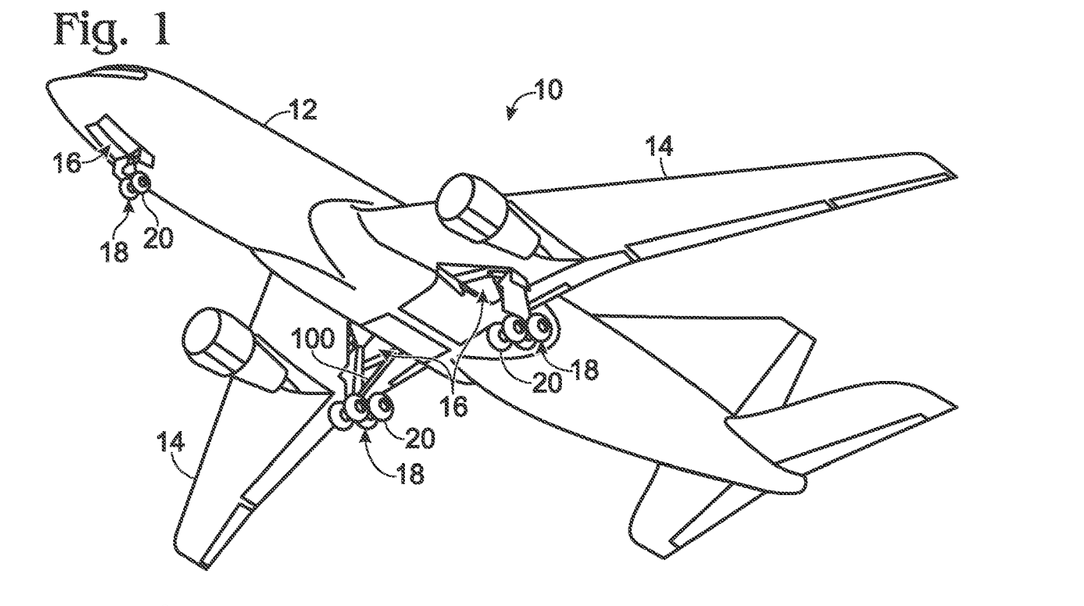
FIG. 1 is a perspective view of an example aircraft.

FIG. 1 is an illustration of an example aircraft 10 that includes strut assemblies 100 according to the present disclosure. Aircraft 10 generally may be utilized to transport persons and/or cargo. As illustrated in FIG. 1, aircraft 10 generally includes a fuselage 12 and a wing assembly 14 operatively coupled to fuselage 12. Fuselage 12 and/or wing assembly 14 define one or more wheel wells 16 operatively coupled to and/or configured to receive a corresponding landing gear structure 18. Landing gear structure 18 may include a wheel assembly 20 operatively coupled to fuselage 12 via strut assembly 100. In some examples of aircraft 10, the volume of the wheel wells 16 may be minimized so as to maximize the volume available in the fuselage 12 for accommodating passengers, cargo, and structural components, as well as to optimize the aerodynamic properties of the aircraft 10.

Figure 2:
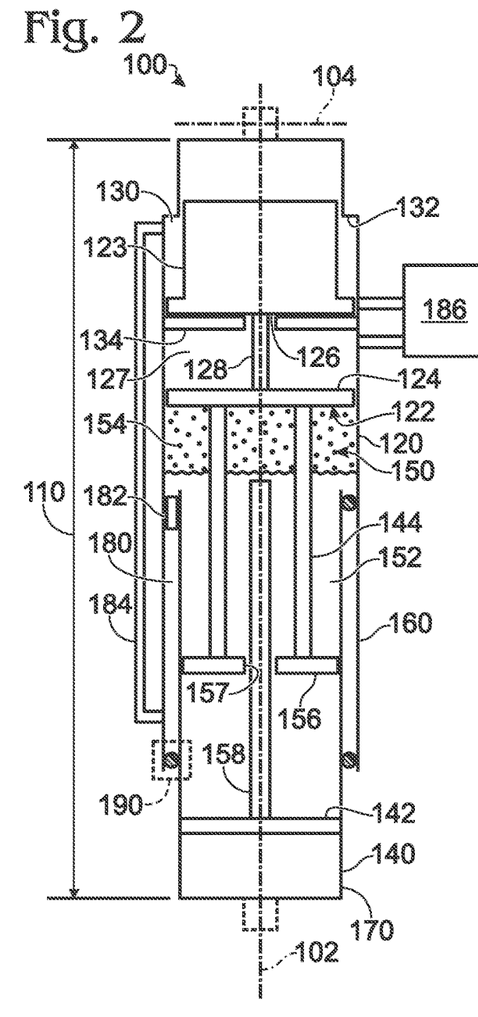
FIG. 2 is a schematic cross-sectional elevation view representing a strut assembly in a compressed configuration.
Figure 3:
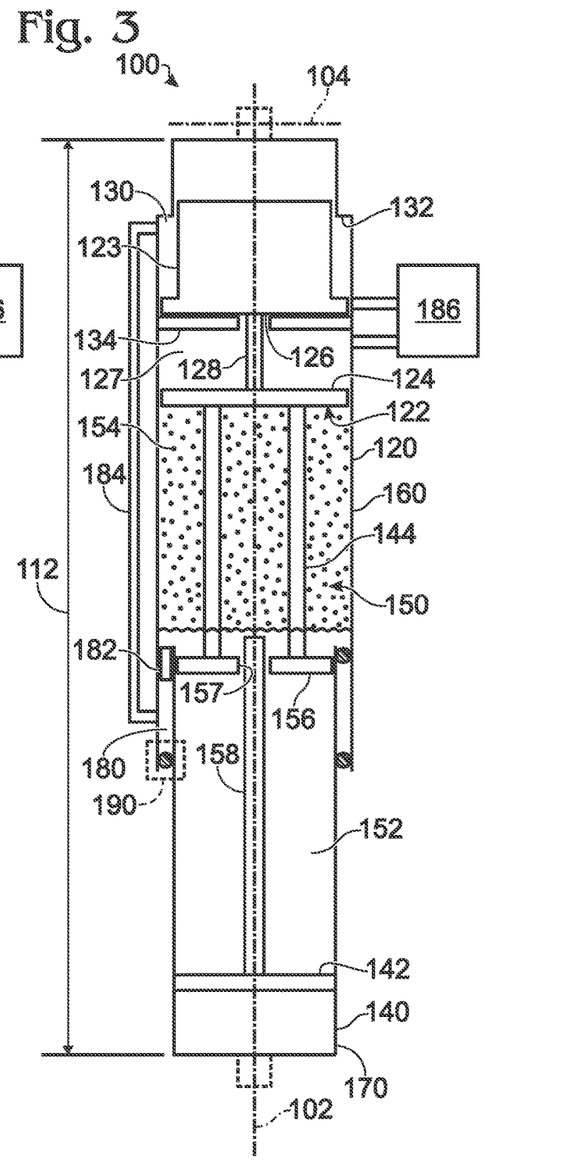
FIG. 3 is a schematic cross-sectional elevation view representing the strut assembly of FIG. 2 in an extended configuration.
Figure 4:
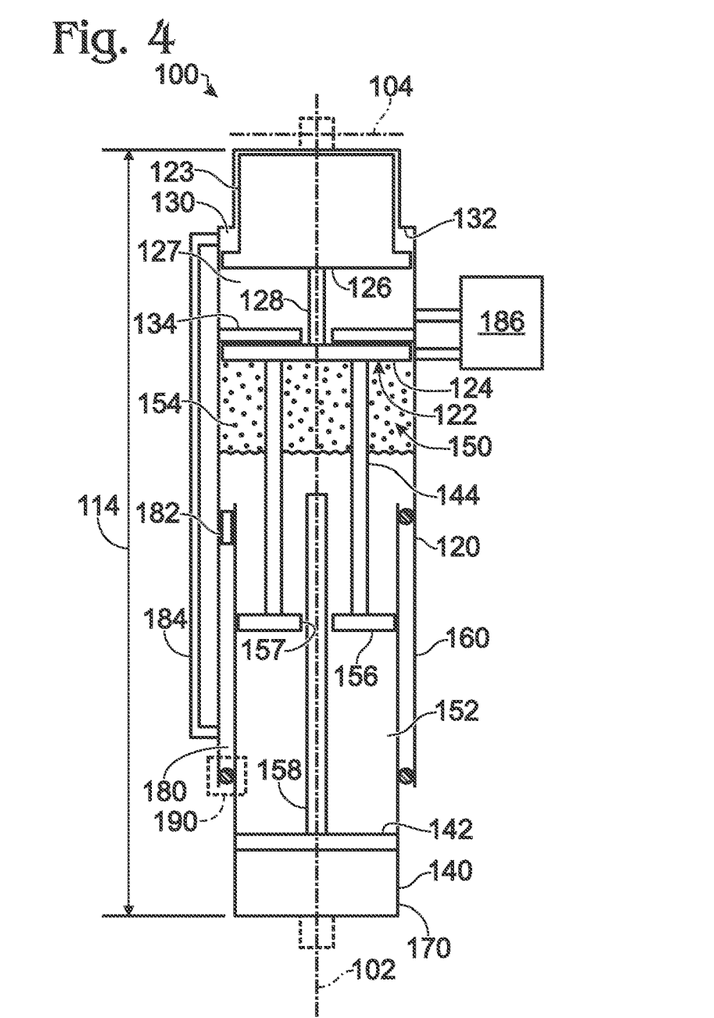
FIG. 4 is a schematic cross-sectional elevation view representing the strut assembly of FIGS. 2-3 in a retracted configuration.

FIGS. 2-4 are schematic views of illustrative, non-exclusive examples of strut assemblies 100, which may form a portion of landing gear structure 18. Specifically, strut assembly 100 may be configured to vary in length responsive to a compressive force exerted on strut assembly 100, such as to attenuate an impact force and/or shock propagating from wheel assembly 20 to fuselage 12 when aircraft 10 lands on a runway.

In general, and as discussed in detail herein, strut assemblies 100 and/or landing gear structures 18 may be configured to retract in a manner that decreases an internal strut pressure relative to traditional oleo strut designs. Similarly, strut assemblies 100 and/or landing gear structures 18 may be configured such that aircraft 10 can accommodate a longer landing gear structure 18 without increasing the size of wheel well 16.

As schematically illustrated in FIGS. 2-4, strut assembly 100 has a longitudinal axis 102, and is configured to extend and retract along longitudinal axis 102 to transition between at least a compressed configuration, an extended configuration, and a retracted configuration. FIG. 2 illustrates strut assembly 100 in the compressed configuration, in which strut assembly 100 has a compressed length 110. The compressed configuration corresponds to strut assembly 100 being fully weighted by aircraft 10. FIG. 3 illustrates strut assembly 100 in the extended configuration, in which strut assembly 100 has an extended length 112. The extended configuration corresponds to strut assembly 100 not being weighted by aircraft 10, such as when aircraft 10 is in flight with landing gear structure 18 deployed. FIG. 4 illustrates strut assembly 100 in the retracted configuration, in which strut assembly 100 has a retracted length 114. The retracted configuration corresponds to a configuration for stowage of landing gear structure 18 within wheel well 16. Strut assembly 100 is configured such that compressed length 110 and retracted length 114 each are less than extended length 112. Strut assembly 100 further may be configured such that retracted length 114 is less than compressed length 110.

As illustrated in FIGS. 2-4, strut assembly 100 includes an upper tubular housing 120 and a lower tubular housing 140 coupled to upper tubular housing 120. Upper tubular housing 120 may be configured to be operatively and pivotally coupled about a pivot axis 104 within wheel well 16 of aircraft 10. Pivot axis 104 may be transverse, or at least substantially transverse, to longitudinal axis 102. Lower tubular housing 140 is configured to be longitudinally translated relative to upper tubular housing 120. As an example, lower tubular housing 140 may longitudinally translate generally toward upper tubular housing 120 (such as to reduce a length of strut assembly 100) when aircraft 10 lands on a runway, such as to absorb a landing impact force. As another example, lower tubular housing 140 may longitudinally translate generally toward upper tubular housing 120 (such as to reduce a length of strut assembly 100) when strut assembly 100 is transitioned from the extended configuration to the retracted configuration, such as to prepare landing gear structure 18 for stowage within wheel well 16.

As used herein, positional terms such as "upper," "lower," "above," "below," and the like may be used to describe spatial relationships between components of strut assembly 100 in an illustrative, non-limiting manner, and generally refer to a configuration in which landing gear structure 18 is deployed with wheel assembly 20 facing and/or contacting a ground surface. For example, upper tubular housing 120 may be described as being positioned generally vertically above lower tubular housing 140. Such terms are provided as context only and do not limit component parts of strut assembly 100 to always be in a specific orientation relative to ground.

As illustrated in FIGS. 2-4, lower tubular housing 140 may extend generally within upper tubular housing 120, in which case upper tubular housing 120 also may be referred to as an outer tubular housing 160, and/or lower tubular housing 140 also may be referred to as an inner tubular housing 170. However, this is not required, and it is additionally within the scope of the present disclosure that upper tubular housing 120 may extend generally within lower tubular housing 140 and/or that outer tubular housing 160 may be positioned generally vertically below inner tubular housing 170.

Strut assembly 100 additionally includes an upper bulkhead 122 supported by upper tubular housing 120. Upper bulkhead 122 is configured to be selectively and longitudinally translated between a lower position and an upper position. FIGS. 2-3 illustrate upper bulkhead 122 in the lower position, while FIG. 4 illustrates upper bulkhead 122 in the upper position. Upper bulkhead 122 is in the lower position when strut assembly 100 is in the compressed configuration and the extended configuration, and is in the upper position when strut assembly 100 is in the retracted configuration. Stated differently, transitioning upper bulkhead 122 from the lower position to the upper position may cause, facilitate, and/or correspond to a transition of strut assembly 100 from the extended configuration to the retracted configuration.

Strut assembly 100 further includes a lower bulkhead 142 supported by lower tubular housing 140 and configured to be selectively and longitudinally translated between a compressed position, an extended position, and a retracted position. Specifically, lower bulkhead 142 is in the compressed position when strut assembly 100 is in the compressed configuration (as illustrated in FIG. 2), is in the extended position when strut assembly 100 is in the extended configuration (as illustrated in FIG. 3), and is in the retracted position when strut assembly 100 is in the retracted configuration (as illustrated in FIG. 4). In some instances, the compressed position may be the same, or at least substantially the same, as the retracted position. Wheel assembly 20 may be coupled to lower tubular housing 140.

Upper bulkhead 122 and lower bulkhead 142 together define a pressure chamber 150 that extends between upper bulkhead 122 and lower bulkhead 142. Pressure chamber 150 contains a volume of strut liquid 152 and a mass of strut gas 154. Strut liquid 152 may include and/or be any appropriate hydraulic fluid, such as an oil, mineral oil, an aviation hydraulic fluid, and/or a fluid sold under the trademark SKYDROL. Strut gas 154 may include and/or be any appropriate gas, such as air or nitrogen gas. Strut gas 154 has a compressed pressure when strut assembly 100 is on the compressed configuration, an extended pressure when strut assembly 100 is in the extended configuration, and a retracted pressure when strut assembly 100 is in the retracted configuration. The compressed pressure is greater than each of the extended pressure and the retracted pressure. Additionally or alternatively, the retracted pressure may be greater than the extended pressure.

With continued reference to FIGS. 2-4, strut assembly 100 may include an orifice plate 156 positioned within pressure chamber 150. Orifice plate 156 may include an orifice 157 through which strut liquid 152 passes when strut assembly 100 transitions between the compressed configuration and the extended configuration. Orifice plate 156 may be fixed to upper bulkhead 122, such as by a pressure chamber connection member 144 that extends at least partially between upper bulkhead 122 and orifice plate 156. Pressure chamber connection member 144 may be a hollow pressure chamber connection member 144, and/or may be a perforated pressure chamber connection member 144.

During operation of strut assembly 100, lower tubular housing 140 may be configured to translate with respect to upper tubular housing 120, such that the volume of strut liquid 152 serves to compress the mass of strut gas 154 to provide a shock absorbing effect. For example, FIG. 3 may illustrate a configuration of strut assembly 100 immediately prior to aircraft 10 landing on a runway, while FIG. 2 may illustrate a configuration of strut assembly 100 subsequent to aircraft 10 landing on the runway and in which the weight of aircraft 10 is fully borne by the landing gear structures 18. As is seen in comparing FIGS. 3 and 2, as strut liquid 152 compresses strut gas 154, strut liquid 152 passes through orifice plate 156, which restricts and/or limits a rate at which strut liquid 152 may flow therethrough. Hence, orifice plate 156 serves to dampen a compression of strut gas 154 and/or limits a rate at which lower tubular housing 140 translates with respect to upper tubular housing 120.

Strut assembly 100 additionally may include a metering pin 158 positioned within pressure chamber 150 and extending through orifice 157 of orifice plate 156. Metering pin 158 may be configured to meter and/or control a flow of strut liquid 152 through orifice plate 156 when strut assembly 100 transitions between the compressed configuration and the extended configuration. For example, metering pin 158 may be a tapered metering pin 158 with a diameter that tapers along a length of tapered metering pin 158. In such a configuration, a flow rate of strut liquid 152 may generally be proportional to a difference between a diameter of orifice 157 of orifice plate 156 and a diameter of a portion of metering pin 158 that is positioned within orifice 157, such that the flow rate varies as lower bulkhead 142 moves with respect to upper bulkhead 122. It is additionally within the scope of the present disclosure that metering pin 158 may refer to, include, and/or be a metering tube 158. For example, metering tube 158 may be a hollow and/or perforated tube that includes holes extending through the tube configured to control the flow rate of strut liquid 152 through orifice plate 156. As illustrated in FIGS. 2-4, metering pin 158 may be fixed to lower bulkhead 142. However, this is not required, and it is additionally within the scope of the present disclosure that metering pin 158 may be operatively coupled to any appropriate component of strut assembly 100.

Strut assembly 100 may be configured such that upper tubular housing 120 and/or lower tubular housing 140 define a recoil chamber 180. For example, and as illustrated in FIGS. 2-4, recoil chamber 180 may at least partially occupy a generally annular volume defined between upper tubular housing 120 and lower tubular housing 140. Recoil chamber 180 may be fluidly connected to pressure chamber 150 via a recoil valve 182 positioned between pressure chamber 150 and recoil chamber 180. Recoil valve 182 may be configured to regulate a flow of strut liquid 152 between pressure chamber 150 and recoil chamber 180 when strut assembly 100 transitions between the extended configuration and the compressed configuration. Recoil valve 182 additionally or alternatively may be configured to selectively restrict and/or prevent a flow of strut liquid 152 between pressure chamber 150 and recoil chamber 180 when strut assembly 100 transitions between the extended configuration and the retracted configuration. An illustrative, non-exclusive example of recoil valve 182 is disclosed in U.S. Pat. No. 8,998,133, the complete disclosure of which is hereby incorporated by reference.

With continued reference to FIGS. 2-4, upper tubular housing 120 may define an upper liquid chamber 130 positioned generally above upper bulkhead 122. For example, strut assembly 100 may include an upper wall 132 fixed within upper tubular housing 120, and upper liquid chamber 130 may be defined by and/or bound by upper tubular housing 120, upper wall 132, and upper bulkhead 122. As illustrated in FIGS. 2-4, upper bulkhead 122 may include an upper portion 123 that extends through, within, and/or adjacent to upper wall 132. Upper portion 123 may be a hollow upper portion 123.

Strut assembly 100 additionally may include a liquid conduit 184 that fluidly connects upper liquid chamber 130 to recoil chamber 180, and thus also indirectly to pressure chamber 150. For example, liquid conduit 184 may carry strut liquid 152 from upper liquid chamber 130 to recoil chamber 180 when strut assembly 100 transitions from the extended configuration to the retracted configuration, and/or may carry strut liquid 152 from recoil chamber 180 to upper liquid chamber 130 when strut assembly 100 transitions from the retracted configuration to the extended configuration. As illustrated in FIGS. 2-4, liquid conduit 184 may be external of upper tubular housing 120 and lower tubular housing 140. However, this is not required, and it is additionally within the scope of the present disclosure that liquid conduit 184 may pass through and/or be received within at least a portion of upper tubular housing 120 and/or lower tubular housing 140.

As discussed, upper bulkhead 122 may be configured to be selectively and longitudinally translated between the lower position and the upper position when strut assembly 100 transitions between the extended configuration and the retracted configuration. To define a range of motion of upper bulkhead 122, strut assembly 100 additionally may include an upper bulkhead restriction structure 134. For example, upper bulkhead restriction structure 134 may be fixed to upper tubular housing 120 and may be configured to restrict longitudinal translation of upper bulkhead 122 with respect to upper tubular housing 120, such as to define the lower position and the upper position of upper bulkhead 122.

As a more specific example, and as illustrated in FIGS. 2-4, upper bulkhead 122 may include a lower plate 124 and an upper plate 126 longitudinally spaced above lower plate 124. Lower plate 124 and upper plate 126 may be connected by a connecting structure 128, such that connecting structure 128 extends between and is fixed to lower plate 124 and upper plate 126 and extends through upper bulkhead restriction structure 134. In an embodiment in which connecting structure 128 and upper portion 123 each are hollow, internal volumes of connecting structure 128 and upper portion 123 may be connected, such as fluidly connected. Lower plate 124 and upper plate 126 may define an upper bulkhead space 127 therebetween. As illustrated in FIGS. 2-3, lower plate 124 and upper plate 126 may be configured such that lower plate 124 is distal to upper bulkhead restriction structure 134 and upper plate 126 is proximal to upper bulkhead restriction structure 134 when upper bulkhead 122 is in the lower position. As illustrated in FIG. 4, lower plate 124 and upper plate 126 may be configured such that lower plate 124 is proximal to upper bulkhead restriction structure 134 and upper plate 126 is distal to upper bulkhead restriction structure 134 when upper bulkhead 122 is in the upper position.

Strut assembly 100 additionally may include a hydraulic upper bulkhead control assembly 186 operatively coupled to upper tubular housing 120. Hydraulic upper bulkhead control assembly 186 may be configured to selectively position upper bulkhead 122 in the upper position and in the lower position, such as by selectively and operatively flowing hydraulic fluid in upper bulkhead space 127. More specifically, hydraulic upper bulkhead control assembly 186 may be configured to selectively pressurize with hydraulic fluid upper bulkhead space 127 below upper bulkhead restriction structure 134 to selectively position upper bulkhead 122 in the lower position. Similarly, hydraulic upper bulkhead control assembly 186 may be configured to selectively pressurize with hydraulic fluid upper bulkhead space 127 above upper bulkhead restriction structure 134 to selectively position upper bulkhead 122 in the upper position. The hydraulic fluid utilized by hydraulic upper bulkhead control assembly 186 may include and/or be any appropriate hydraulic fluid, such as an oil, mineral oil, an aviation hydraulic fluid, and/or a fluid sold under the trademark SKYDROL, and may be have composition identical to, similar to, or distinct from that of strut liquid 152.

In operation, hydraulic upper bulkhead control assembly 186 may effectively cause strut assembly 100 to transition from the extended configuration to the retracted configuration. For example, while strut assembly 100 is in the extended configuration, recoil valve 182 may be actuated so as to restrict and/or prevent strut liquid 152 from flowing between recoil chamber 180 and pressure chamber 150. While recoil valve 182 is actuated to restrict and/or prevent strut liquid 152 from flowing between recoil chamber 180 and pressure chamber 150, hydraulic upper bulkhead control assembly 186 may flow hydraulic fluid from a portion of upper bulkhead space 127 that is generally between lower plate 124 and upper bulkhead restriction structure 134 to a portion of upper bulkhead space 127 that is generally between upper plate 126 and upper bulkhead restriction structure 134, thereby translating upper bulkhead 122 longitudinally upward. The longitudinal translation of upper bulkhead 122 may have the effect of decreasing a volume of upper liquid chamber 130, thus flowing strut liquid 152 from upper liquid chamber 130 through liquid conduit 184 and to recoil chamber 180. Because recoil valve 182 is actuated to restrict strut liquid 152 from flowing from recoil chamber 180 to pressure chamber 150 in this case, lower tubular housing 140 is biased longitudinally upward so as to increase a volume of recoil chamber 180, thereby reaching the retracted configuration.

As illustrated in FIGS. 2-4, strut assembly 100 additionally may include a strut lock mechanism 190 configured to selectively and operably maintain lower tubular housing 140 in a fixed, or at least substantially fixed, orientation with respect to upper tubular housing 120, such as to maintain strut assembly 100 in the retracted configuration. Strut lock mechanism 190 may include and/or be any suitable mechanical and/or hydraulic mechanism operable to maintain strut assembly 100 in the retracted configuration.

As discussed, strut assembly 100 generally may be configured such that the compressed pressure of strut gas 154 is greater than the retracted pressure of strut gas 154 and/or the retracted pressure of strut gas 154 is greater than the extended pressure of strut gas 154. As examples, the compressed pressure of strut gas 154 may be 2-10, 2-8, 2-6, 2-4, 4-10, 4-8, 4-6, 6-10, 6-8, and/or 8-10 times greater than the retracted pressure of strut gas 154. Additionally or alternatively, the retracted pressure of strut gas 154 may be 1-4,1-3,1-2,2-4,2-3, and/or 3-4 times greater than the extended pressure of strut gas 154.

As further examples, the retracted pressure of strut gas 154 may be in a range of 500-1500 pounds per square inch (psi) (3450-10300 kilopascals [kPa]), 500-1250 psi (3450-8620 kPa), 500-1000 psi (3450-6900 kPa), 500-750 psi (3450-5170 kPa), 750-1500 psi (5170-10300 kPa), 750-1250 psi (5170-8620 kPa), 750-1000 psi (5170-6900 kPa), 1000-1500 psi (6900-10300 kPa), 1000-1250 psi (6900-8620 kPa), and/or 1250-1500 psi (8620-10300 kPa), and/or may be approximately 500 psi (3450 kPa), 750 psi (5170 kPa), 1000 psi (6900 kPa), 1250 psi (8620 kPa), or 1500 psi (10300 kPa). Additionally or alternatively, the extended pressure of strut gas 145 may be in a range of 0-1000 psi (0-6900 kPa), 0-750 psi (0-5170 kPa), 0-500 psi (0-3450 kPa), 0-250 psi (0-1720 kPa), 250-1000 psi (1720-6900 kPa), 250-750 psi (1720-5170 kPa), 250-500 psi (1720-3450 kPa), 500-1000 psi (3450-6900 kPa), 500-750 psi (3450-5170 kPa), and/or 750-1000 psi (5170-6900 kPa), and/or may be approximately 250 psi (1720 kPa), 500 psi (3450 kPa), 750 psi (5170 kPa), or 1000 psi (6900 kPa).

As discussed, and as illustrated in FIGS. 3-4, extended length 112 of strut assembly 100 may be greater than retracted length 114 of strut assembly 100. As examples, extended length 112 may be 1.2-1.5 times greater than retracted length 114. As further examples, a difference between extended length 112 and retracted length 114 may be in a range of 10-25 inches (25-64 centimeters [cm]), 10-20 inches (25-51 cm), 10-15 inches (25-38 cm), 15-25 inches (38-64 cm), 15-20 inches (38-51 cm), and/or 20-25 inches (51-64 cm).

FIGS. 5-8 schematically provide flowcharts that represent illustrative, non-exclusive examples of methods according to the present disclosure. In FIGS. 5-8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 5-8 are not limiting and other methods and steps are within the scope of the present disclosure, including methods having greater than or fewer than the number of steps illustrated, as understood from the discussions herein.

Figure 5:
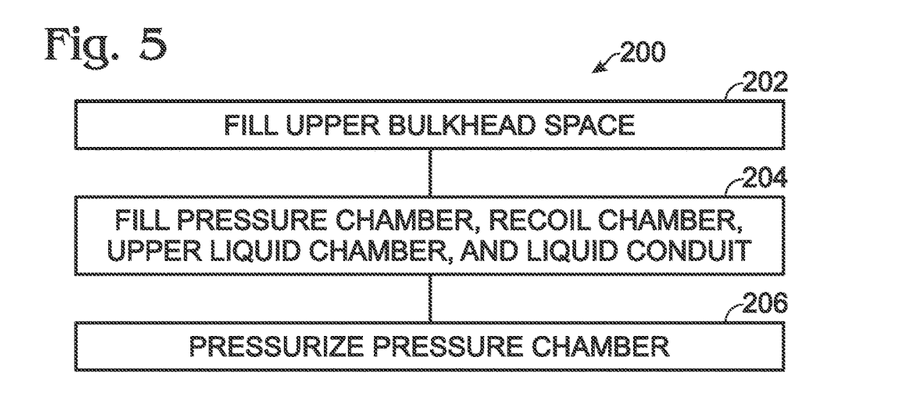
FIG. 5 is a flowchart schematically representing methods of servicing a strut assembly.

As seen in FIG. 5, a method 200 of servicing landing gear structure 18 may include, with upper bulkhead 122 in the lower position, filling 202 upper bulkhead space 127 between lower plate 124 and upper bulkhead restriction structure 134 with hydraulic fluid, filling 204 pressure chamber 150, recoil chamber 180, upper liquid chamber 130, and liquid conduit 184 with strut liquid 152, and pressurizing 206 pressure chamber 150 with strut gas 154 to the extended pressure, thereby transitioning strut assembly 100 to the extended configuration.

Figure 6:
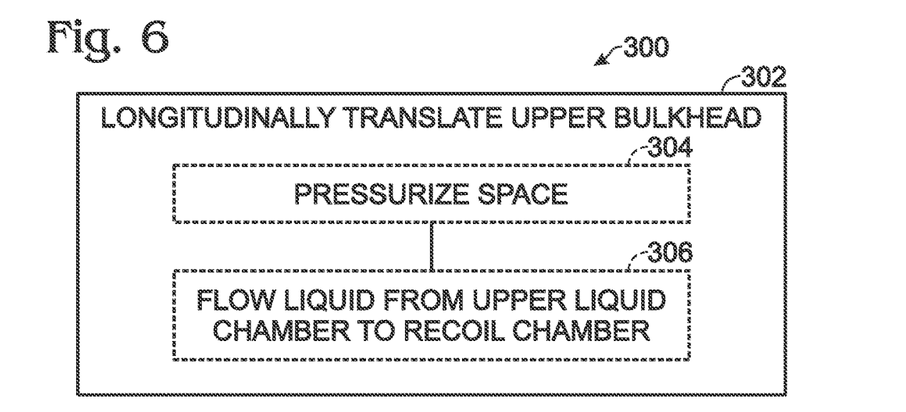
FIG. 6 is a flowchart schematically representing methods of retracting a strut assembly for stowing aircraft landing gear.

As seen in FIG. 6, a method 300 of retracting a strut assembly (such as strut assembly 100) for stowing a landing gear structure (such as landing gear structure 18) includes longitudinally translating 302 an upper bulkhead (such as upper bulkhead 122) within an upper tubular housing (such as upper tubular housing 120) from a lower position to an upper position. As schematically illustrated in dashed lines in FIG. 6, method 300 also may include a step of pressurizing 304 a space (such as upper bulkhead space 127) between an upper plate (such as upper plate 126) of the upper bulkhead and an upper bulkhead restriction structure (such as upper bulkhead restriction structure 134) that is fixed to the upper tubular housing. Additionally or alternatively, and as schematically illustrated in dashed lines in FIG. 6, method 300 also may include a step of flowing 306 liquid from an upper liquid chamber (such as upper liquid chamber 130) positioned above the upper bulkhead within the upper tubular housing to a recoil chamber (such as recoil chamber 180). During the flowing 306, the liquid may be prevented from passing from the recoil chamber to a pressure chamber (such as pressure chamber 150) that is defined between the upper bulkhead and a lower bulkhead (such as lower bulkhead 142). The flowing 306 thus may have the effect of longitudinally translating a lower tubular housing (such as lower tubular housing 140) upward.

Figure 7:
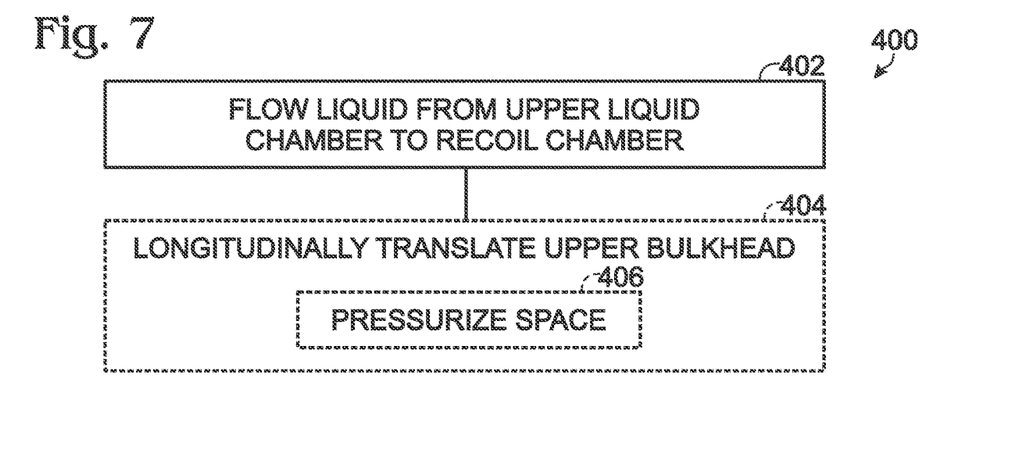
FIG. 7 is a flowchart schematically representing methods of retracting a strut assembly for stowing aircraft landing gear.

As seen in FIG. 7, a method 400 of retracting a strut assembly (such as strut assembly 100) for stowing a landing gear structure (such as landing gear structure 18) includes flowing 402 liquid from an upper liquid chamber (such as upper liquid chamber 130) positioned above an upper bulkhead (such as upper bulkhead 122) within an upper tubular housing (such as upper tubular housing 120) to a recoil chamber (such as recoil chamber 180). During the flowing 402, the liquid may be prevented from passing from the recoil chamber to a pressure chamber (such as pressure chamber 150) that is defined between the upper bulkhead and a lower bulkhead (such as lower bulkhead 142). The flowing 402 thus may have the effect of longitudinally translating a lower tubular housing (such as lower tubular housing 140) upward.

As schematically illustrated in dashed lines in FIG. 7, method 400 also may include the step of longitudinally translating 404 the upper bulkhead within the upper tubular housing from a lower position to an upper position, such that the longitudinally translating 404 causes the flowing 402. Additionally, and as illustrated in dashed lines in FIG. 7, the longitudinally translating 404 may include pressurizing 406 an upper bulkhead space (such as upper bulkhead space 127) between an upper plate (such as upper plate 126) of the upper bulkhead and an upper bulkhead restriction structure (such as upper bulkhead restriction structure 134) that is fixed to the upper tubular housing.

Figure 8:
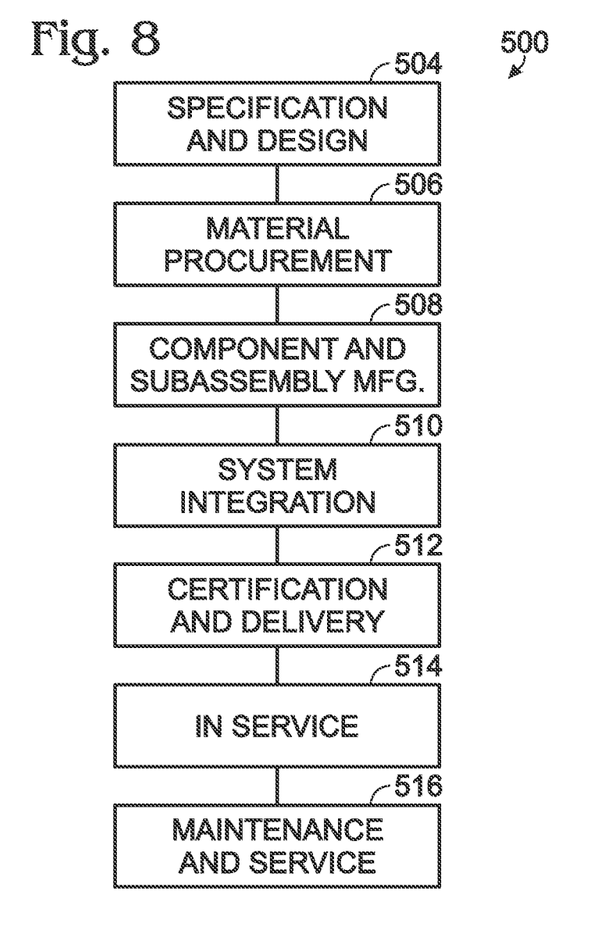
FIG. 8 is a flowchart schematically representing aircraft production and service methodology.
Figure 9:
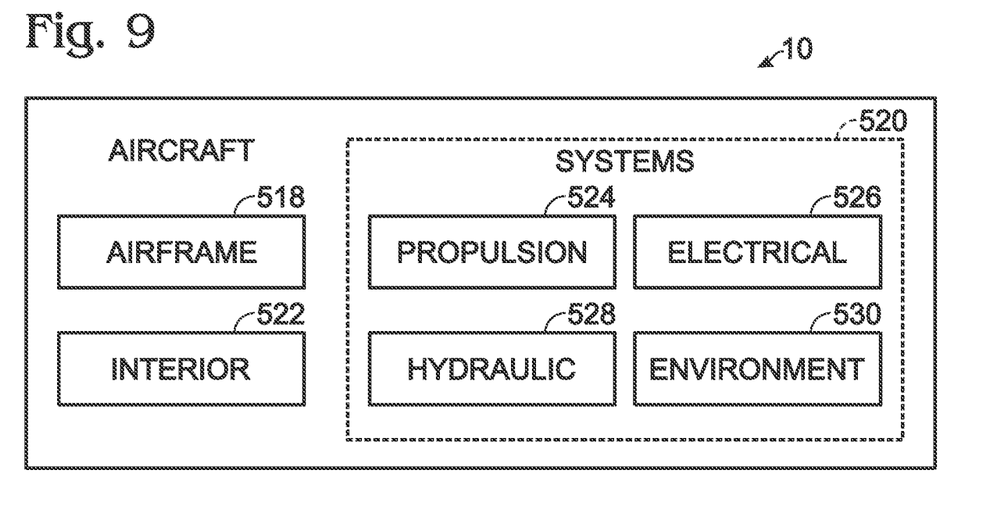
FIG. 9 is a block diagram schematically representing an aircraft.

Turning now to FIGS. 8-9, embodiments of the present disclosure may be described in the context of an aircraft manufacturing and service method 500 as shown in FIG. 8 and an aircraft 10 as shown in FIG. 9. During pre-production, exemplary method 500 may include specification and design 504 of the aircraft 10 and material procurement 506. During production, component and subassembly manufacturing 508 and system integration 510 of the aircraft 10 takes place. Thereafter, the aircraft 10 may go through certification and delivery 512 in order to be placed in service 514. While in service, the aircraft 10 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 10 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 500. For example, components or subassemblies corresponding to production process 508 may be fabricated or manufactured in a manner similar to components or subassemblies produced while the aircraft 10 is in service. Also, one or more apparatus embodiments, method embodiments, or a combination thereof may be utilized during the production stages 508 and 510, for example, by substantially expediting assembly of or reducing the cost of an aircraft 10. Similarly, one or more of apparatus embodiments, method embodiments, or a combination thereof may be utilized while the aircraft 10 is in service, for example and without limitation, to maintenance and service 516.

Illustrative, non-exclusive examples of inventive subject matter according to the present disclosure are described in the following enumerated paragraphs:

A. An aircraft landing gear structure, comprising:
a strut assembly having a longitudinal axis, wherein the strut assembly is configured to transition between a compressed configuration in which the strut assembly has a compressed length when the strut assembly is fully weighted by an aircraft, an extended configuration in which the strut assembly has an extended length when the strut assembly is not weighted by the aircraft, and a retracted configuration for stowage of the aircraft landing gear within an aircraft wheel well and in which the strut assembly has a retracted length, wherein the compressed length and retracted length are less than the extended length, and wherein the strut assembly comprises:
an upper tubular housing;
an upper bulkhead supported by the upper tubular housing and configured to be selectively and longitudinally translated between a lower position and an upper position, wherein the upper bulkhead is in the lower position when the strut assembly is in the compressed configuration and when the strut assembly is in the extended configuration, and wherein the upper bulkhead is in the upper position when the strut assembly is in the retracted configuration;
a lower tubular housing operatively coupled to the upper tubular housing and configured to be longitudinally translated relative to the upper tubular housing;
a lower bulkhead supported by the lower tubular housing and configured to be longitudinally translated between a compressed position when the strut assembly is in the compressed configuration and an extended position when the strut assembly is in the extended configuration, wherein the lower bulkhead is further configured to be selectively and longitudinally translated to a retracted position when the strut assembly is in the retracted configuration, and wherein a pressure chamber is defined between the lower bulkhead and the upper bulkhead; and
a volume of strut liquid and a mass of strut gas positioned within the pressure chamber, wherein the mass of strut gas has a compressed pressure when the strut assembly is in the compressed configuration, an extended pressure when the strut assembly is in the extended configuration, and a retracted pressure when the strut assembly is in the retracted configuration, and wherein the compressed pressure is greater than the extended pressure and the retracted pressure.

A1. The aircraft landing gear of paragraph A, further comprising:
an orifice plate positioned within the pressure chamber, wherein the strut liquid passes through the orifice plate when the strut assembly transitions between the compressed configuration and the extended configuration.

A1.1. The aircraft landing gear of paragraph A1, wherein the orifice plate is fixed to the upper bulkhead.

A1.2. The aircraft landing gear of any of paragraphs A1-A1.1, further comprising:

a metering pin positioned within the pressure chamber and extending through the orifice plate, wherein the metering pin is configured to meter a flow of the strut liquid through the orifice plate when the strut assembly transitions between the compressed configuration and the extended configuration.

A1.2.1. The aircraft landing gear of paragraph A1.2, wherein the metering pin is fixed to the lower bulkhead.

A2. The aircraft landing gear of any of paragraphs A-A1.2.1, wherein the upper tubular housing is configured to be operatively and pivotally coupled about a pivot axis within an aircraft wheel well, and wherein the pivot axis is transverse to the longitudinal axis of the strut assembly.

A3. The aircraft landing gear of any of paragraphs A-A2, wherein one of the upper tubular housing and the lower tubular housing comprises an outer tubular housing, wherein the other of the upper tubular housing and the lower tubular housing comprises an inner tubular housing, and wherein the inner tubular housing extends within the outer tubular housing.

A4. The aircraft landing gear of any of paragraphs A-A3, wherein at least one of the upper tubular housing and the lower tubular housing defines a recoil chamber, and wherein the strut assembly further comprises:

a recoil valve positioned between the pressure chamber and the recoil chamber, wherein the recoil valve is configured to regulate flow of the strut liquid between the pressure chamber and the recoil chamber when the strut assembly transitions between the extended configuration and the compressed configuration.

A4.1. The aircraft landing gear of paragraph A4, wherein the recoil valve is further configured to selectively prevent flow of the strut liquid between the pressure chamber and the recoil chamber when the strut assembly transitions between the extended configuration and the retracted configuration.

A4.2. The aircraft landing gear of any of paragraphs A4-A4.1 when depending from paragraph A3, wherein the recoil chamber is defined between the outer tubular housing and the inner tubular housing.

A4.3. The aircraft landing gear of any of paragraphs A4-A4.2, wherein the upper tubular housing defines an upper liquid chamber positioned above the upper bulkhead, wherein the strut assembly further comprises a liquid conduit that fluidly connects the upper liquid chamber to the recoil chamber, wherein the strut liquid flows from the upper liquid chamber to the recoil chamber when the strut assembly transitions from the extended configuration to the retracted configuration, and wherein the strut liquid flows from the recoil chamber to the upper liquid chamber when the strut assembly transitions from the retracted configuration to the extended configuration.

A4.3.1. The aircraft landing gear of paragraph A4.3, wherein the strut assembly further comprises an upper wall fixed within the upper tubular housing, and wherein the upper liquid chamber is bound by the upper tubular housing, the upper wall, and the upper bulkhead.

A4.3.1.1. The aircraft landing gear of paragraph A4.3.1, wherein the upper bulkhead has an upper portion that extends through, within, and/or adjacent to the upper wall.

A4.3.1.1.1. The aircraft landing gear of paragraph A4.3.1.1, wherein the upper portion is hollow.

A4.3.2. The aircraft landing gear of any of paragraphs A4.3-A4.3.1.1.1, wherein the liquid conduit is external of the upper tubular housing and the lower tubular housing.

A5. The aircraft landing gear of any of paragraphs A-A4.3.2, wherein the strut assembly further comprises an upper bulkhead restriction structure fixed to the upper tubular housing and configured to restrict longitudinal translation of the upper bulkhead and thereby define the lower position and the upper position of the upper bulkhead.

A5.1. The aircraft landing gear of paragraph A5, wherein the upper bulkhead comprises a lower plate, an upper plate longitudinally spaced above the lower plate and defining an upper bulkhead space between the lower plate and the upper plate, and a connecting structure extending between and fixed to the lower plate and the upper plate;

wherein the connecting structure extends through the upper bulkhead restriction structure; and wherein the lower plate is distal to the upper bulkhead restriction structure and the upper plate is proximal to the upper bulkhead restriction structure when the upper bulkhead is in the lower position, and wherein the lower plate is proximal to the upper bulkhead restriction structure and the upper plate is distal to the upper bulkhead restriction structure when the upper bulkhead is in the upper position.

A5.1.1. The aircraft landing gear of paragraph A5.1, wherein the strut assembly further comprises:

a hydraulic upper bulkhead control assembly operatively coupled to the upper tubular housing, wherein the hydraulic upper bulkhead control assembly is configured to selectively pressurize with hydraulic fluid the upper bulkhead space below the upper bulkhead restriction structure to selectively position the upper bulkhead in the lower position, and wherein the hydraulic upper bulkhead control assembly is configured to selectively pressurize with hydraulic fluid the upper bulkhead space above the upper bulkhead restriction structure to selectively position the upper bulkhead in the upper position.

A5.1.2. The aircraft landing gear of any of paragraphs A5.1-A5.1.1, wherein the connecting structure is hollow.

A5.1.2.1. The aircraft landing gear of paragraph A5.1.2 when depending from paragraph A4.3.1.1.1, wherein internal volumes of the connecting structure and the upper portion are connected.

A6. The aircraft landing gear of any of paragraphs A-A5.1.2.1, wherein the compressed pressure is 2-10, 2-8, 2-6, 2-4, 4-10, 4-8, 4-6, 6-10, 6-8, or 8-10 times greater than the retracted pressure.

A7. The aircraft landing gear of any of paragraphs A-A6, wherein the retracted pressure is 1-4, 1-3, 1-2, 2-4, 2-3, or 3-4 times greater than the extended pressure.

A8. The aircraft landing gear of any of paragraphs A-A7, wherein the retracted pressure is in a range of 500-1500 psi, 500-1250 psi, 500-1000 psi, 500-750 psi, 750-1500 psi, 750-1250 psi, 750-1000 psi, 1000-1500 psi, 1000-1250 psi, or 1250-1500 psi, or is approximately 500 psi, 750 psi, 1000 psi, 1250 psi, or 1500 psi.

A9. The aircraft landing gear of any of paragraphs A-A8, wherein the extended pressure is in a range of 0-1000 psi, 0-750 psi, 0-500 psi, 0-250 psi, 250-1000 psi, 250-750 psi, 250-500 psi, 500-1000 psi, 500-750 psi, or 750-1000 psi, or is approximately 250 psi, 500 psi, 750 psi, or 1000 psi.

A10. The aircraft landing gear of any of paragraphs A-A9, wherein the extended length is 1.2-1.5 times greater than the retracted length.

A11. The aircraft landing gear of any of paragraphs A-A10, wherein a difference between the extended length and the retracted length is in a range of 10-25 inches, 10-20 inches, 10-15 inches, 15-25 inches, 15-20 inches, or 20-25 inches.

A12. The aircraft landing gear of any of paragraphs A-A11, wherein the retracted length is less than the compressed length.

A13. The aircraft landing gear of any of paragraphs A-A12, further comprising:
a wheel assembly operably coupled to the lower tubular housing.

A14. An aircraft, comprising:
a fuselage;
a wing assembly operatively coupled to the fuselage, wherein one or more of the fuselage and the wing assembly define one or more wheel wells; and
one or more of the aircraft landing gear of any of paragraphs A-A13 operatively coupled to the one or more wheel wells.

A14.1. The use of the aircraft of paragraph A14 to transport persons and/or cargo.

A15. The use of the aircraft landing gear of any of paragraphs A-A13 on an aircraft.

B. A method of servicing the aircraft landing gear of any of paragraphs A5.1-A12 when depending from paragraph A4.3 and paragraph A5.1, the method comprising:
with the upper bulkhead in the lower position:
filling the upper bulkhead space between the lower plate and the upper bulkhead restriction structure with hydraulic fluid;
filling the pressure chamber, the recoil chamber, the upper liquid chamber, and the liquid conduit with the strut liquid; and
pressurizing the pressure chamber with the strut gas to the extended pressure and thereby transitioning the strut assembly to the extended configuration.

C. A method of retracting a strut assembly for stowing aircraft landing gear, the method comprising:
longitudinally translating an upper bulkhead within an upper tubular housing from a lower position to an upper position.

C1. The method of paragraph C, wherein the longitudinally translating comprises pressurizing an upper bulkhead space between an upper plate of the upper bulkhead and an upper bulkhead restriction structure that is fixed to the upper tubular housing.

C2. The method of any of paragraphs C-C1, wherein the longitudinally translating the upper bulkhead comprises flowing liquid from an upper liquid chamber positioned above the upper bulkhead within the upper tubular housing to a recoil chamber, wherein during the flowing, the liquid is prevented from passing from the recoil chamber to a pressure chamber that is defined between the upper bulkhead and a lower bulkhead, thereby longitudinally translating a lower tubular housing upward relative to the upper tubular housing.

C3. The method of any of paragraphs C-C2, wherein the strut assembly is the strut assembly of the aircraft landing gear of any of paragraphs A-A13.

D. A method of retracting a strut assembly for stowing aircraft landing gear, the method comprising:
flowing liquid from an upper liquid chamber positioned above an upper bulkhead within an upper tubular housing to a recoil chamber, wherein during the flowing, the liquid is prevented from passing from the recoil chamber to a pressure chamber that is defined between the upper bulkhead and a lower bulkhead, thereby longitudinally translating a lower tubular housing upward.

D1. The method of paragraph D, further comprising:
longitudinally translating the upper bulkhead within the upper tubular housing from a lower position to an upper position, wherein the longitudinally translating causes the flowing.

D1.1. The method of paragraph D1, wherein the longitudinally translating the upper bulkhead comprises pressurizing an upper bulkhead space between an upper plate of the upper bulkhead and an upper bulkhead restriction structure that is fixed to the upper tubular housing.

D2. The method of any of paragraphs D-D1.1, wherein the strut assembly is the strut assembly of the aircraft landing gear of any of paragraphs A-A13.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of retracting a strut assembly for stowing aircraft landing gear, the method comprising longitudinally translating an upper bulkhead within an upper tubular housing from a lower position to an upper position, wherein the longitudinally translating includes pressurizing an upper bulkhead space between an upper plate of the upper bulkhead and an upper bulkhead restriction structure that is fixed to the upper tubular housing, wherein the longitudinally translating the upper bulkhead includes flowing liquid from an upper liquid chamber positioned above the upper bulkhead within the upper tubular housing to a recoil chamber, and wherein during the flowing, the liquid is prevented from passing from the recoil chamber to a pressure chamber that is defined between the upper bulkhead and a lower bulkhead, thereby longitudinally translating a lower tubular housing upward relative to the upper tubular housing.

2. The method of claim 1, wherein the recoil chamber is an annular volume defined between the upper tubular housing and the lower tubular housing.

3. The method of claim 2, wherein a liquid conduit fluidly connects the upper liquid chamber to the recoil chamber, and wherein during the flowing, the liquid flows through the liquid conduit from the upper liquid chamber to the recoil chamber.

4. The method of claim 1,
wherein the upper bulkhead includes a lower plate, an upper plate longitudinally spaced above the lower plate and defining the upper bulkhead space, and a connecting structure extending between and fixed to the lower plate and the upper plate;
wherein the connecting structure extends through the upper bulkhead restriction structure; and
wherein the lower plate is distal to the upper bulkhead restriction structure and the upper plate is proximal to the upper bulkhead restriction structure when the upper bulkhead is in the lower position, and wherein the lower plate is proximal to the upper bulkhead restriction structure and the upper plate is distal to the upper bulkhead restriction structure when the upper bulkhead is in the upper position.

5. The method of claim 1,
wherein the longitudinally translating comprises retracting the strut assembly from an extended configuration to a retracted configuration;
wherein the strut assembly is configured to transition between a compressed configuration in which the strut assembly has a compressed length when the strut assembly is fully weighted by an aircraft, the extended configuration in which the strut assembly has an extended length when the strut assembly is not weighted by the aircraft, and the retracted configuration for stowage of the aircraft landing gear within an aircraft wheel well and in which the strut assembly has a retracted length, wherein the compressed length and the retracted length are less than the extended length; and
wherein the strut assembly comprises:
the upper tubular housing;
the upper bulkhead supported by the upper tubular housing and configured to be selectively and longitudinally translated between the lower position and the upper position, wherein the upper bulkhead is in the lower position when the strut assembly is in the compressed configuration and when the strut assembly is in the extended configuration, and wherein the upper bulkhead is in the upper position when the strut assembly is in the retracted configuration;
a lower tubular housing operatively coupled to the upper tubular housing and configured to be longitudinally translated relative to the upper tubular housing;
a lower bulkhead supported by the lower tubular housing and configured to be longitudinally translated between a compressed position when the strut assembly is in the compressed configuration and an extended position when the strut assembly is in the extended configuration, wherein the lower bulkhead is further configured to be selectively and longitudinally translated to a retracted position when the strut assembly is in the retracted configuration, and wherein a pressure chamber is defined between the lower bulkhead and the upper bulkhead; and
a volume of strut liquid and a mass of strut gas positioned within the pressure chamber, wherein the mass of strut gas has a compressed pressure when the strut assembly is in the compressed configuration, an extended pressure when the strut assembly is in the extended configuration, and a retracted pressure when the strut assembly is in the retracted configuration, and wherein the compressed pressure is greater than the extended pressure and the retracted pressure.

6. The method of claim 5, wherein the compressed pressure is 2-10 times greater than the retracted pressure.

7. The method of claim 5, wherein the retracted pressure is 1-4 times greater than the extended pressure.

8. The method of claim 5, wherein the retracted pressure is in a range of 500-1500 psi.

9. The method of claim 1, wherein the liquid is prevented from passing from the recoil chamber to the pressure chamber by a recoil valve positioned between the pressure chamber and the recoil chamber.

10. The method of claim 1, wherein the longitudinally translating comprises retracting the strut assembly from an extended configuration to a retracted configuration, and wherein the method further comprises maintaining the strut assembly in the retracted configuration by a strut lock mechanism that maintains the lower tubular housing in a fixed orientation with respect to the upper tubular housing.

11. A method of retracting a strut assembly for stowing aircraft landing gear, the method comprising:
flowing liquid from an upper liquid chamber positioned above an upper bulkhead within an upper tubular housing to a recoil chamber, wherein during the flowing, the liquid is prevented from passing from the recoil chamber to a pressure chamber that is defined between the upper bulkhead and a lower bulkhead, thereby longitudinally translating a lower tubular housing upward; and
longitudinally translating the upper bulkhead within the upper tubular housing from a lower position to an upper position, wherein the longitudinally translating causes the flowing, and wherein the longitudinally translating comprises pressurizing an upper bulkhead space between an upper plate of the upper bulkhead and an upper bulkhead restriction structure that is fixed to the upper tubular housing.

12. The method of claim 11, wherein the recoil chamber is an annular volume defined between the upper tubular housing and the lower tubular housing.

13. The method of claim 12, wherein a liquid conduit fluidly connects the upper liquid chamber to the recoil chamber, and wherein during the flowing, the liquid flows through the liquid conduit from the upper liquid chamber to the recoil chamber.

14. The method of claim 11,
wherein the upper bulkhead includes a lower plate, an upper plate longitudinally spaced above the lower plate and defining an upper bulkhead space, and a connecting structure extending between and fixed to the lower plate and the upper plate;

wherein the connecting structure extends through an upper bulkhead restriction structure that is fixed to the upper tubular housing; and wherein the lower plate is distal to the upper bulkhead restriction structure and the upper plate is proximal to the upper bulkhead restriction structure when the upper bulkhead is in a lower position, and wherein the lower plate is proximal to the upper bulkhead restriction structure and the upper plate is distal to the upper bulkhead restriction structure when the upper bulkhead is in an upper position.

15. The method of claim 11, wherein the longitudinally translating further comprises retracting the strut assembly from an extended configuration to a retracted configuration;

wherein the strut assembly is configured to transition between a compressed configuration in which the strut assembly has a compressed length when the strut assembly is fully weighted by an aircraft, the extended configuration in which the strut assembly has an extended length when the strut assembly is not weighted by the aircraft, and the retracted configuration for stowage of the aircraft landing gear within an aircraft wheel well and in which the strut assembly has a retracted length, wherein the compressed length and the retracted length are less than the extended length; and wherein the strut assembly comprises:
the upper tubular housing;
the upper bulkhead supported by the upper tubular housing and configured to be selectively and longitudinally translated between a lower position and an upper position, wherein the upper bulkhead is in the lower position when the strut assembly is in the compressed configuration and when the strut assembly is in the extended configuration, and wherein the upper bulkhead is in the upper position when the strut assembly is in the retracted configuration;
the lower tubular housing operatively coupled to the upper tubular housing and configured to be longitudinally translated relative to the upper tubular housing;
the lower bulkhead supported by the lower tubular housing and configured to be longitudinally translated between a compressed position when the strut assembly is in the compressed configuration and an extended position when the strut assembly is in the extended configuration, wherein the lower bulkhead is further configured to be selectively and longitudinally translated to a retracted position when the strut assembly is in the retracted configuration; and
a volume of strut liquid and a mass of strut gas positioned within the pressure chamber, wherein the mass of strut gas has a compressed pressure when the strut assembly is in the compressed configuration, an extended pressure when the strut assembly is in the extended configuration, and a retracted pressure when the strut assembly is in the retracted configuration, and wherein the compressed pressure is greater than the extended pressure and the retracted pressure.

16. The method of claim 15, wherein the compressed pressure is 2-10 times greater than the retracted pressure.

17. The method of claim 15, wherein the retracted pressure is 1-4 times greater than the extended pressure.

18. The method of claim 15, wherein the retracted pressure is in a range of 500-1500 psi.

19. The method of claim 11, wherein the liquid is prevented from passing from the recoil chamber to the pressure chamber by a recoil valve positioned between the pressure chamber and the recoil chamber.

20. The method of claim 11, wherein the longitudinally translating comprises retracting the strut assembly from an extended configuration to a retracted configuration, and wherein the method further comprises maintaining the strut assembly in the retracted configuration by a strut lock mechanism that maintains the lower tubular housing in a fixed orientation with respect to the upper tubular housing.

* * * * *